(12) United States Patent
Bihlmaier et al.

(10) Patent No.: US 11,742,497 B2
(45) Date of Patent: Aug. 29, 2023

(54) METHOD AND DEVICE FOR PRODUCING A MEMBRANE ELECTRODE ASSEMBLY FOR A FUEL CELL

(71) Applicant: cellcentric GmbH & Co. KG, Kirchheim unter Teck (DE)

(72) Inventors: Oliver Bihlmaier, Kernen (DE); Johannes Deutsch, Fellbach (DE); Alexandra Fotiou, Esslingen (DE); Wolfgang Hansen, Esslingen (DE); Volker Horinek, Fellbach (DE); Bettina Janson, Vaihingen/Enz (DE); Marco Mraz, Bretten-Bauerbach (DE); Eyuep Akin Oezdeniz, Walheim am Neckar (DE); Uwe Pfister, Winnenden (DE); Leoni Pretzel, Fellbach (DE); Helmut Rauner, Kirchheim (DE); Nico Riede, Kornwestheim (DE); Tim Rueckert, Stuttgart (DE); Dominik Schuhmacher, Weinstadt (DE); Holger Seibt, Hassloch (DE); Harald Tober, Boeblingen (DE); Christian Wulff, Ludwigsburg (DE); Karl Zimmerer, Stuttgart (DE)

(73) Assignee: CELLCENTRIC GMBH & CO. KG, Kirchheim unter Teck (DE)

( * ) Notice: Subject to any disclaimer, the term of this patent is extended or adjusted under 35 U.S.C. 154(b) by 1223 days.

(21) Appl. No.: 15/751,377

(22) PCT Filed: Jul. 23, 2016

(86) PCT No.: PCT/EP2016/001284
§ 371 (c)(1),
(2) Date: Feb. 8, 2018

(87) PCT Pub. No.: WO2017/025171
PCT Pub. Date: Feb. 16, 2017

(65) Prior Publication Data
US 2018/0241054 A1  Aug. 23, 2018

(30) Foreign Application Priority Data
Aug. 11, 2015 (DE) .................... 10 2015 010 440.3

(51) Int. Cl.
*H01M 8/0286* (2016.01)
*H01M 8/0273* (2016.01)
(Continued)

(52) U.S. Cl.
CPC ....... *H01M 8/0273* (2013.01); *H01M 8/0286* (2013.01); *H01M 8/1004* (2013.01); *H01M 8/241* (2013.01); *H01M 2008/1095* (2013.01)

(58) Field of Classification Search
None
See application file for complete search history.

(56) References Cited

U.S. PATENT DOCUMENTS 5,981,107 A * 11/1999 Hamano ............. H01M 4/0402
                                                                429/231.95
2005/0095490 A1  5/2005  Mittelstadt et al.
(Continued)

FOREIGN PATENT DOCUMENTS

CN       1950963 A    4/2007
CN     101563803 A   10/2009
(Continued)

OTHER PUBLICATIONS

PCT/EP2016/001284, International Search Report (PCT/ISA/210) dated Sep. 9, 2016, with partial English translation, enclosing Written Opinion of the International Searching Authority (PCT/ISA/237) (Fifteen (15) pages).
(Continued)

*Primary Examiner* — Zhongqing Wei
(74) *Attorney, Agent, or Firm* — Sheridan Ross P.C.

(57) ABSTRACT

A method for producing a membrane electrode assembly for a fuel cell includes providing a first component of the
(Continued)

membrane electrode assembly as part of a continuous material web which passes through a plurality of processing stations and connecting a second component of the membrane electrode assembly to the first component by a firmly bonded connection.

5 Claims, 3 Drawing Sheets

(51) Int. Cl.
*H01M 8/1004* (2016.01)
*H01M 8/241* (2016.01)
*H01M 8/10* (2016.01)

(56) References Cited

U.S. PATENT DOCUMENTS

| | | | |
|---|---|---|---|
| 2005/0244700 A1* | 11/2005 | Abd Elhamid | H01M 8/0213 |
| | | | 429/480 |
| 2008/0142152 A1 | 6/2008 | Debe et al. | |
| 2008/0143061 A1* | 6/2008 | Steinbach | H01M 8/1004 |
| | | | 277/654 |
| 2009/0162734 A1* | 6/2009 | Yandrasits | H01M 8/242 |
| | | | 429/514 |
| 2010/0167176 A1 | 7/2010 | Kawai | |
| 2012/0321986 A1 | 12/2012 | Mekala et al. | |

FOREIGN PATENT DOCUMENTS

| | | |
|---|---|---|
| CN | 104756297 A | 7/2015 |
| DE | 20 2009 007 702 U1 | 10/2009 |
| DE | 11 2008 001 580 T5 | 4/2010 |
| DE | 10 2011 105 180 A1 | 12/2012 |
| DE | 10 2012 020 975 a1 | 4/2014 |
| WO | WO 2007/088049 A1 | 8/2007 |

OTHER PUBLICATIONS

German Office Action issued in German counterpart application No. 10 2015 010 440.3 dated Mar. 17, 2016 (Seven (7) pages).
Z.X. Liang et al., "A Glue Method for Fabricating Membrane Electrode Assemblies for Direct Methanol Fuel Cells", Electrochimica Acta, vol. 51, Jun. 8, 2006, pp. 6412-6418, XP002761198.
Chinese Office Action issued in Chinese application No. 201680046419.8 dated Apr. 7, 2020, with partial English translation (Ten (10) Pages).
Chinese Office Action issued in Chinese application No. 201680046419.8 dated Nov. 25, 2020, with partial English translation (Twelve (12) pages).

* cited by examiner

METHOD AND DEVICE FOR PRODUCING A MEMBRANE ELECTRODE ASSEMBLY FOR A FUEL CELL

BACKGROUND AND SUMMARY OF THE INVENTION

The invention relates to a method for producing a membrane electrode assembly for a fuel cell, wherein at least one first component of the membrane electrode assembly is provided as part of a continuous material web. The material web passes through a plurality of processing stations. Here, at least one second component of the membrane electrode assembly is connected to the at least one first component. Furthermore, the invention relates to a device for producing a membrane electrode assembly.

It is known from prior art to handle the individual components of a membrane electrode assembly individually when producing fuel cells. Such a manufacturing according to a so-called pick-and-place principle is very laborious. This is because the very sensitive, individual components of the membrane electrode assembly have to be dealt with very carefully. Furthermore, such a kind of production is accompanied by high cycle times. Furthermore, in particular for large-scale production, here, very high investments in facilities, areas and clean-room technology are incurred in relation to output.

With pick-and-place technology, robots or grippers arranged on rails can be used, which can carry out the movements in the different spatial directions (x, y, z), in particular via portal axes, in order to place the different components of the respective membrane electrode assembly with the required accuracy. The production of membrane electrode assemblies and fuel cells in mass production is thus challenging, not only in terms of the material costs, but also because of the required handling of the very filigree and dirt-sensitive components.

Thus, efforts are made to achieve a continuous manufacturing of membrane electrode assemblies. Thus, DE 11 2008 001 580 T5 describes continuously conveying an electrolyte membrane web which is fitted with further components of a membrane electrode assembly in a plurality of processing steps. Here, the catalyst materials are firstly applied to the membrane via processing rollers and then the gas diffusion layers. Hot sealing is used here to connect the gas diffusion layers to the catalyst-coated membrane. To do so, the processing rollers are warmed to a predetermined temperature. Since in DE 11 2008 001 580 T5, the electrolyte membrane passes through the production device, and since the electrolyte membrane is comparatively sensitive, a strain relief mechanism is provided in this production device.

Here, the fact that it is difficult to obtain a sufficiently tight connection of the components of the membrane electrode assembly can be seen as disadvantageous.

The object of the present invention is therefore to create an improved method of the type cited above, as well as a corresponding device.

The method according to the invention serves to produce a membrane electrode assembly for a fuel cell. Here, at least one first component of the membrane electrode assembly is provided as part of a continuous material web, which passes through a plurality of processing stations. At least one second component of the membrane electrode assembly is connected to the at least one first component. This firmly bonded connection, which also provides a seal, in particular a gas-tight seal, can take place by means of adhesion, welding or soldering.

Preferably, this connection takes place by using at least one adhesive. When using adhesive connections, at least one adhesive is applied to at least one of the components, the adhesive causing the connection of the at least one first component to the at least one second component. Furthermore, the adhesive can be applied specifically where it is required or desired for connecting the at least two components and for producing a gas-tightness. Thus, an improved method is created.

As a result of the conversion of a non-continuous production method into a continuous one in which the material web passes through the processing stations, a particularly efficient manufacturing of the membrane electrode assemblies can be achieved. While in the case an isolated manufacturing, the respective components of the membrane electrode assembly are provided as respectively isolated piece goods, a particularly low cycle time, in particular, can be achieved by means of the central, continuous processing of the material web or goods web. The cycle time, i.e., the time taken to manufacture an individual membrane electrode assembly, can here be reduced to less than one second. In contrast, with pick-and-place technology used up until now, only a cycle time of about 60 seconds can be achieved.

As a result of the method, a clearly higher output can thus be achieved with the same area requirement for the device for producing the membrane electrode assembly. With mass production, i.e., when producing the membrane electrode assemblies in high quantities, there was thus a clear reduction in the area requirement. The continuous material web or goods web is refined piece by piece up to final processing, but not isolated before final production. Furthermore, a decrease in the production costs can be achieved depending on the membrane electrode assembly.

By means of the method, in particular with as high a yield as possible or with a particularly great output of membrane electrode assemblies, fixed reference systems and close tolerances can be achieved. Furthermore, a particularly good reproducibility can be achieved, for example as a result of providing reference marks on the material web. The method is thus particularly reliable.

The at least one printable adhesive also acts as a sealing element, in particular between an anode side and a cathode side of a membrane of the membrane electrode assembly. To do so, it can be provided, for example, to encapsulate the membrane around the edge by means of the at least one adhesive, which serves to connect at least two components of the membrane electrode assembly. The adhesive thus prevents an oxidant passing over from the cathode side to the anode side or a fuel from the anode side to the cathode side when the fuel cell that has the membrane electrode assembly is in operation.

Furthermore, a scalability of the yield can be achieved in an advantageous manner independently of the area provided for the device for production and the investment costs necessary for the device. To do so, only the speed with which the material web passes through the processing stations needs to be changed.

Thus, the long cycle times and the limitations associated therewith are thus improved in terms of the yield of existing systems which use pick-and-place technology. This is successful even with a design of the device for producing the membrane electrode assembly, which enables manufacturing the membrane electrode assembly at one second intervals, having a minimal footprint, i.e., having a very low construction space requirement for the device. With the method, it is possible to process the fluid or paste-like adhesive and all other components of the membrane electrode assembly in one device, in particular in a printing machine or a different roll-processing machine, and to join the components to the finished component, i.e., to the membrane electrode assembly.

The at least one adhesive can preferably be cured by supplying it with electromagnetic radiation, in particular by supplying it with UV radiation and/or with infra-red radiation. When crosslinking the molecules of the adhesive, radiation-initiated reaction mechanisms can thus preferably be used. After curing the adhesive, this preferably has properties that are favorable for sealing the connection points between the components of the membrane electrode assembly, in particular elastic properties.

In particular, liquid or paste-like adhesives can be used as the at least one adhesive, for example cold adhesives and/or hot adhesives such as acrylate, cyan acrylate, epoxy resin, polyethylene and/or polypropylene.

The membrane electrode assembly serves for use in a so-called polymer electrolyte membrane fuel cell. The principle construction of a polymer electrolyte membrane fuel cell—PEMFC for short—is as follows. The PEMFC contains a membrane electrode assembly—MEA for short—that is made up of an anode, a cathode and a polymer electrolyte membrane—PEM for short—arranged therebetween (also ionomeric membrane). For its part, the MEA is in turn arranged between two separator plates, wherein one separator plate has channels for the distribution of fuel and the other separator plate has channels for the distribution of oxidants, and wherein the channels are facing towards the MEA. The channels form a channel structure, a so-called flow field or current field. The electrodes, anode and cathode are, in general, formed as gas diffusion electrodes—GDE for short. These have the function of diverting the current generated by the electrochemical reaction (for example 2 $H_2+O_2 \square 2\ H_2O$) and allowing the reactives, educts and products, to diffuse through. A GDE can comprise at least one gas diffusion coating or gas diffusion layer—GDL for short. A respective catalyst coating which faces towards the PEM can also be provided by the GDE. The electrochemical reaction takes place on the catalyst coating. However, the anodic catalyst coating and the cathodic catalyst coating can also be applied to a respective main surface of the PEM. In this case, we generally talk of a catalyst-coated membrane—CCM for short, i.e., a membrane coated with a catalyst.

Furthermore, the GDE can have yet another gas distribution layer. Gas diffusion layers and gas distribution layers differ above all in terms of their pore size and thus in the type of transport mechanism for a reactive (diffusion or distribution).

Such a fuel cell can generate electric current having high power with relatively low operating temperatures. Real fuel cells are usually stacked to form so-called fuel cell stacks—stacks for short, in order to obtain a high power output, wherein, instead of the mono-polar separator plates, bipolar separator plates, so-called bipolar plates, are used, and mono-polar separator plates form only the two terminal ends of the stack. They are sometimes called end plates and can differ considerably from the bipolar plates in terms of construction.

The bipolar plates are usually made up of two partial plates. These partial plates have substantially complementary shapes that are mirror images in terms of a mirror plane. Yet the partial plates do not necessarily have to be mirror images. It is only important that they have at least one common touching surface on which they can be connected. The partial plates have a defined topography. Hereby, the channel structures previously mentioned emerge on the surfaces of the partial plates each pointing away from one another. On the surfaces of the partial plates each pointing towards one another, there is the channel structure complementary to the channel structure mentioned above, for example with stamped metallic partial plates. When superimposing the two partial plates, there is thus a cavity between the partial plates, on the surfaces thereof that are pointing towards one another, the cavity consisting of a system of several tunnels connected to one another. The cavity or the system of tunnels is surrounded in a liquid-tight manner by a join substantially running around the partial plates in the edge region, wherein openings for supplying and removing coolant are provided such that the cavity can be used for the distribution of a coolant.

Thus, the following belong to the tasks of a bipolar plate: the distribution of oxidants and reductants, the distribution of coolant and thus the cooling (or rather tempering) of the fuel cells, the fluid separation of the individual cells of a stack from one another, moreover the electrical contacting of the individual cells of a stack switched one after the other and thus the passage of the electric current generated by the individual cells.

A frame material is preferably provided as the at least one first component that forms a frame of the membrane electrode assembly that can be used in the fuel cell. Here, the frame encompasses an active region of the membrane electrode assembly. The active region of the membrane electrode assembly is one in which the reactions of the oxidants and the fuel cell take place. A support for a membrane of the membrane electrode assembly can be provided by the frame. In addition, the frame enables, in particular, the application of sealing elements for sealing the membrane electrode assembly with regard to separator plates or bipolar plates. Furthermore, the frame material can be provided in a state which enables passing through the different processing stations particularly well.

The frame material is preferably connected to a carrier web, wherein a base web is formed which comprises the frame material connected to the carrier web. However, in alternative embodiments, the membrane can also be connected to the frame material without a carrier web being provided. The carrier web thus serves, in particular, to strengthen the frame material when passing through the processing stations. Here, the carrier web receives all tensile stress necessary for the web transport and thus relieves the frame material.

Thus, a frame material that has lower tensile properties can also be used. Thus, where necessary, a more favorable material can be selected. However, this auxiliary carrier is preferably later removed. The carrier web is thus preferably not permanently integrated into the membrane electrode assembly that can be used in the fuel cell. In this embodiment, a membrane of the membrane electrode assembly to be manufactured can be connected to the frame material of the base web by means of the at least one adhesive, wherein the base web comprises the frame material connected to the carrier web.

To connect the carrier web to the frame material, in particular, a further adhesive can be used which can differ from the adhesive used to connect the at least one first component to the at least one second component of the membrane electrode assembly. Since this further adhesive preferably does not remain in the membrane electrode assembly, rather it serves only to hold the carrier web and the frame material together during the production of the membrane electrode assembly. Thus, a particularly simple, cost-effective material can be used as this further adhesive.

It has furthermore proven to be advantageous when a region corresponding to the active region of the membrane electrode assembly is separated off, wherein the adherence of the carrier web is retained in this region. In this way, a cut-out in the frame material can be created. Nevertheless, it can be ensured that no undesirably high tensile force is exerted on a further component of the membrane electrode assembly to be connected to the frame material since the carrier web is not weakened.

A membrane can be connected to the frame material as the at least one second component. This is, therefore, particularly advantageous when the region corresponding to the active region of the membrane electrode assembly has already been separated from the frame material. Then the membrane is therefore easily accessible after removing the region separated from the frame material, such that the membrane can be provided with the respective gas diffusion electrodes. In addition, the frame material provides the membrane with an increased load capacity. This facilitates the manufacturing of the membrane electrode assembly in the continuous method.

It can be provided that the membrane is already provided with the respective catalyst material; it is thus a catalyst-coated membrane (CCM). Alternatively, however, the respective catalyst material can also be applied to the membrane at one of the processing stations, in particular by means of a printing method, or alternatively by means of a transfer method, and it can be connected to the membrane.

It is preferred that the at least one adhesive is applied to the membrane and/or to the frame material, wherein at least one gas diffusion element can be connected to the membrane by means of the at least one adhesive. A gas diffusion layer can be provided as the at least one gas diffusion element, the gas diffusion layer facing towards the membrane. The gas diffusion layer can have a smaller pore size than the gas distribution layer which is facing towards the separator plate in the fuel cell. Such gas diffusion elements can also be applied to the membrane in successive steps. Furthermore, it is possible to use a unit as a gas diffusion element which already comprises the two layers of different porosity.

It has proven to be further advantageous when a region enclosing the active region of the membrane electrode assembly is separated from the carrier web. The frame material is therefore accessible from its side facing towards the carrier web. Thus, at least one further component of the membrane electrode assembly can be connected to the frame material from its side facing towards the carrier web.

In a further advantageous embodiment, the at least one adhesive is applied to the frame material, wherein at least one gas diffusion element is connected to the frame material by means of the at least one adhesive. Thus, the membrane electrode assembly can be provided in a particularly simple manner.

Via the membrane, in particular coated with the respective catalyst, or the gas diffusion layer, further components can also be applied to the continuous material web when passing through the processing stations. Thus, for example, at least one sealing element can be applied to the frame material, in particular by means of a printing method. Such a sealing element can seal the membrane electrode assembly with regard to a separator plate or bipolar plate in the fuel cell. By also integrating this step of manufacturing into the production of the membrane electrode assembly, the manufacturing of fuel cells can be particularly extensively streamlined.

Depending on the design of the separator plates or bipolar plates, it is also possible to connect these to the respective membrane electrode assembly as part of the production of the membrane electrode assembly. To do so, the at least one adhesive can also be used, in particular when the adhesive has sealing properties. Furthermore, hot laminating and/or welding can also come into question as further joining methods for connecting the individual components of the membrane electrode assembly to one another.

According to a further advantageous embodiment, at least one reference element is applied to at least one component of the membrane electrode assembly. The reference element is used to determine a position in which at least two of the components of the membrane electrode assembly are connected to one another. By providing such reference elements, which are also known as register marks, a reliable production of the membrane electrode assemblies having particularly low tolerances can be streamlined with a particularly high reproducibility. In addition, such a web speed when moving the material web through the different processing stations can be regulated particularly well. The at least one reference element can be applied to the components of the membrane electrode assembly, in particular by printing, wherein it can be the frame material in particular.

It is preferred that the at least one adhesive is applied to the at least one component by means of a printing method. Here, different printing methods can be used, for example relief printing, gravure printing or stencil printing, in particular silk-screen printing. Furthermore, it is possible to adjust particularly precisely and simply to the respective requirements when applying the adhesive when a digital printing method is used. Here, methods similar to inkjet printing can be used, for example so-called spray printing.

Here it is particularly economical when the at least one adhesive is not applied over the entire surface of the component to be adhered, but only on the points where an adherence of the components in the finished membrane electrode assembly and/or a seal is to be ensured.

Finally, it has proven to be advantageous when a region forming the frame of the membrane electrode assembly is separated from the frame material along the outer contour. Thus, the finished membrane electrode assembly can be provided in one simple method step.

The device according to the invention is designed to carry out the method according to the invention. Correspondingly, the device for producing a membrane electrode assembly for a fuel cell has a plurality of processing stations for processing at least one component of the membrane electrode assembly formed as part of a continuous material web. Furthermore, the device has means for connecting the at least one second component of the membrane electrode assembly to the at least one first component. Here, the connection takes place by means of a firmly bonded connection method.

Advantageously, at least one of the processing stations is formed to apply at least one adhesive to at least one of the components, the adhesive being able to cause the connection of the at least one first component to the at least one second component.

The advantages and preferred embodiments described for the method according to the invention are also valid for the device according to the invention.

The features and combinations of features specified in the description above and the features and combinations of features specified in the description of the figures and/or in the figures only below can be used not only in the combination specified in each case, but also in other combinations or on their own without exceeding the scope of the invention. Thus, embodiments are also to be considered as being comprised and disclosed by the invention which are not explicitly shown or explained in the figures, but which arise and can be produced by separate feature combinations from the described embodiments.

Further advantages, features and details of the invention arise from the claims, the description of preferred embodiments below and with the aid of the figures.

DETAILED DESCRIPTION OF THE DRAWINGS

Figure 1:
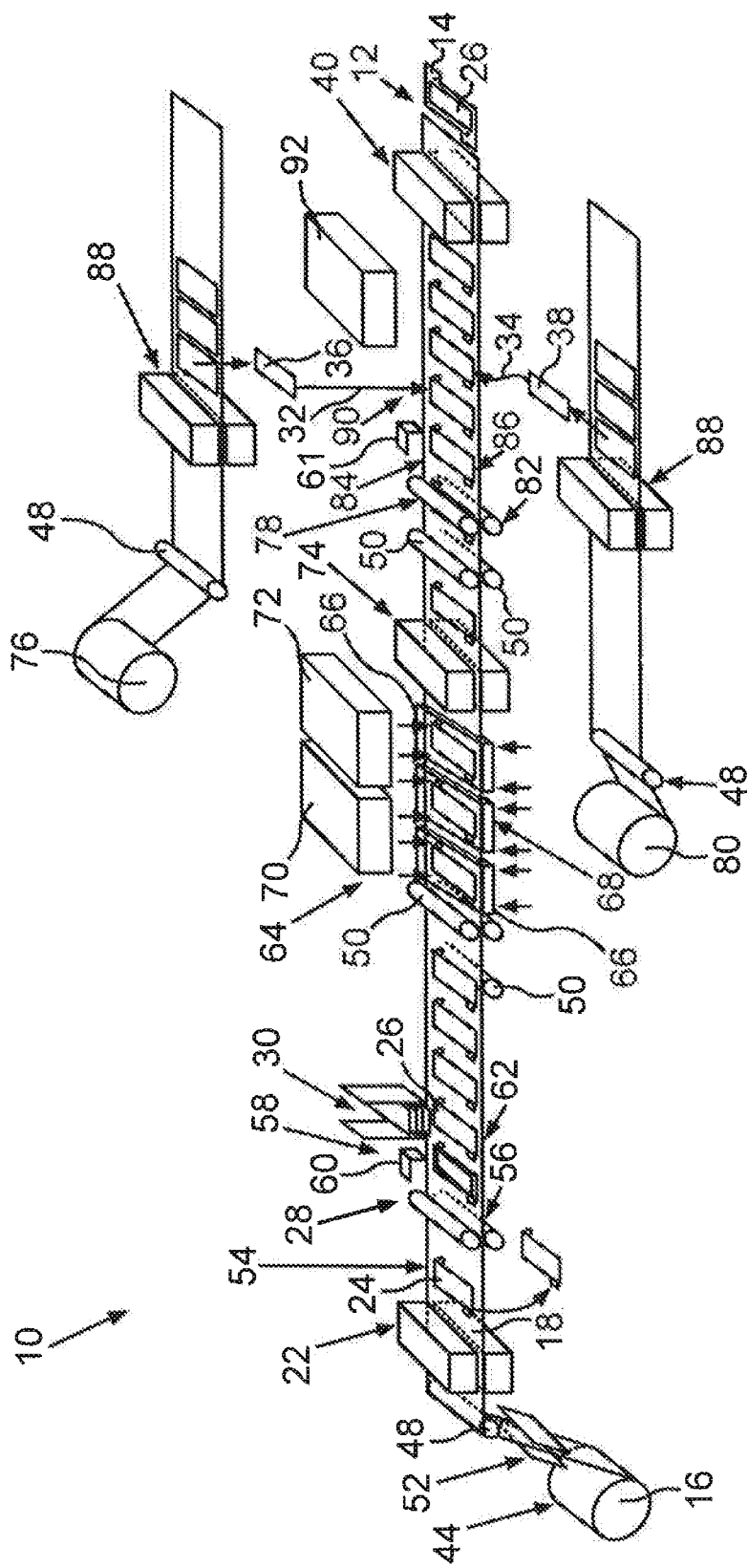
FIG. 1 schematically shows a device for producing a membrane electrode assembly in a continuous process.

Greatly schematized, FIG. 1 shows a device 10 for producing a membrane electrode assembly 12 which has a frame 14, in a continuous production method. Here, a printing method or, alternatively, a different roll-processing method can be used. Here, a continuous material web is unwound from a roller 16, by means of which material web a frame material 18 of the membrane electrode assembly 12 is provided in the present case. Correspondingly, with the finished membrane electrode assembly 12, the frame 14 is formed from the frame material 18. Here, the material web is conveyed in a conveying direction or advancing direction by the device 10. A plastic can be used, for example, as the frame material 18, which is unwound from the roller 16.

FIG. 1 schematically shows the individual processing stations which are passed through when manufacturing the membrane electrode assembly 12. These are illustrated only schematically in FIG. 1 by further arrows which point to the material web of the frame material 18. Punching out a region 24 from the frame material 18 takes place at a processing station 22. In the finished membrane electrode assembly 12, this region 24 is covered by a membrane 26 which is preferably formed as a membrane coated with a catalyst (catalyst-coated membrane, CCM). At a further processing station 28, an adhesive 42 (cf. FIG. 3) is printed onto the frame material 18, for example in a silk-screen printing method or such a rotative process. At processing station 30, the membrane 26 is inserted into the adhesive bed that is still damp.

A cathodic gas diffusion layer 36 and an anodic gas diffusion layer 38 are inserted into the process at further processing stations 32, 34 and are connected to the frame material 18. Finally, at a further processing station, stamping out 40 a part comprising the frame 14 from the frame material 18 takes place such that the membrane electrode assembly 12 provided with the frame 14 is provided.

The goods web in the form of the frame material 18 can move through the device 10 with a pre-set speed of 10 meters per second, for example. The device 10 is here formed, for example, in the style of a printing machine, in particular a roll printing machine. Alternatively, every device that is suitable for a continuous processing of goods webs can be used. The frame material 18 is thus provided or refined piece by piece with the respective further components of the membrane electrode assembly 12 to be manufactured. To do so, the printable adhesive 42 is used, which, in a later function, also acts as a sealant for the membrane electrode assembly 12 (cf. FIG. 3 and FIG. 4). The adhesive 42 here connects the frame material 18 to the membrane 26, the membrane 26 to the cathodic gas diffusion layer 36 and the frame material 18 to the anodic gas diffusion layer 38 (cf. FIG. 4). Alternatively to the assembly shown in FIG. 4, anodic 38 and cathodic 36 gas diffusion layers can also be arranged in an exchanged or swapped manner.

It can be seen particularly clearly in FIG. 1 that rotative processes, in particular, can be used for the processing steps that take place at the different processing stations. Furthermore, separating method steps, method steps of a coating and method steps of a joining are carried out at individual processing stations.

Firstly, an unwinding 44 of the frame material 18 from the roller 16 takes place (cf. FIG. 1). Here, the unwinding 44 can take place in a chain-controlled manner, for example by using gears that interact with corresponding toothed belts or similar. In order to provide a certain tensile stress that acts on the frame material 18, a brake device can be provided which decelerates the frame material 18 relative to the forward moving direction. Furthermore, the unwinding of the frame material 18 from the roller 16 can be provided by connecting the frame material 18 to a carrier web 46 (cf. FIG. 3 and FIG. 4) and a corresponding forward movement of the carrier web 46.

In order to ensure that the frame material 18 moves along a predetermined track through the device 10, an edge regulator, in particular, can be used. Here, a corresponding alignment of the edges of the frame material 18, for example, when passing through the device 10 can be monitored and correspondingly post-regulated by ultrasound sensors. Furthermore, concurrent rollers, for example in the form of guide rollers 48, can serve to guide the track, the rollers 48 being schematically shown in FIG. 1. Furthermore, powered rollers 50 can provide the correct track guidance of the frame material 18. Rollers that guide the frame material 18 can also be provided in a contactless manner which give out compressed air and thus provide air cushions on which the frame material 18 moves through the device 10. This is therefore particularly useful when contact between such rollers and a component of the membrane electrode assembly 12 coated with the adhesive 42 is to be prevented.

In a further step, a processing 52 of at least one of the surfaces of the frame material 18 in order to improve the adhesiveness takes place with the at least one adhesive 42.

As a result of the processing 52, the frame material 18 is prepared for the application of the adhesive 42. Here, the frame material 18 can be processed over the entire surface or only partially. Processing 52 over the entire surface is particularly simple since regions of the frame material 18 that are not specifically defined are to be processed. On the other hand, a partial processing 52 is particularly economical in terms of the substances used for the processing 52 or the energy used for the processing 52. In addition, it can be prevented that the frame 18 undesirably has an effect on points that are not provided for the application of the adhesive 42 when the surface of the frame material 18 is only partially activated.

Separating 54 the region 24 that is provided for the membrane 26 from the frame material 18 takes place in a further step. In such a cutting process, a laser can be used, for example, a rotative punching cylinder or a rolling knife in combination with a fly cutter that cuts the frame material 18 in the shifting direction or the conveying direction of the web. The region 24 can also be separated from the frame material 18 by means of a water jet or a knife supplied with ultrasound frequency.

In a next step, application 56 of the adhesive 42 to the frame material 18 takes place. Here, a printing method is preferably used by means of which the frame material 18 can be coated completely or partially with the adhesive 42. With the device 10 schematically shown in FIG. 2, which is formed as a rolling printing machine, here, a relief printing method, a gravure printing method or a stencil printing method such as a silk-screen printing method can be used, for example. Additionally or alternatively, the adhesive 42 can be applied to the frame material 18 by means of a digital printing method or spray printing method.

Preactivating 58 the adhesive material takes place in a next step. Here, the adhesive 42 can be preactivated by means of a UV lamp 60, for example, such that first crosslinking reactions take place in the adhesive 42. Thus, the viscosity of the adhesive 42 can be set in such a way that the adhesive 42 no longer runs at all, but nevertheless has the desired properties serving to connect the frame material 18 to the membrane 26.

Applying 62 the membrane 26 to the frame material 18 coated with the adhesive 42 takes place in a next step. Joining together the membrane 26 to the frame material 18 takes place at a further processing station 64. Here, pressure plates 66 can exert a corresponding pressure on the frame material 18 provided with the membrane 26. This step of joining can be discrete, by the frame material 18 not being moved further when pressing the pressure plates 66 together. Alternatively, the pressure can also be applied continuously, for example by the pressure plates 66 moving with the frame material 18. The pressure can also be applied continuously or periodically with a certain frequency, in particular with an ultrasound frequency. Furthermore, ultrasound can be supportively used when joining. Hot laminating and/or welding can be used as further joining methods.

In the present case, curing 68 of the adhesive 42 also takes place in the region of the processing station 64. To do so, a further UV lamp 70, for example, can supply the adhesive 42 with corresponding UV radiation. Additionally or alternatively, an infra-red lamp 72 can activate the curing or activation of the adhesive 42 by means of infra-red radiation. Other forms of supplying the adhesive 42 with heat are conceivable.

Supplying the adhesive 42 with UV radiation, infra-red radiation and/or heat can take place partially or evenly over the entire surface of the membrane electrode assembly 12 to be manufactured. As a result of the partial activation of the adhesive 42, it can be achieved that regions of the membrane 26 that are sensitive towards the respective radiation or towards heat cannot be affected. Furthermore, the wavelengths of the electromagnetic radiation with which the adhesive 42 is preferably supplied, can be adjusted in terms of the spectra in such a way that they penetrate to different depths in the adhesive 42. Thus, a particularly even activation or curing of the adhesive 42 can be achieved over the entire thickness. Furthermore, the adhesive 42 can be activated by means of ultrasound and/or by means of electron beams.

Activating the adhesive 42 can take place continuously or in a pulsed manner. With a discontinuous supply of the adhesive 42 with the radiation, the ultrasound and/or the electron beam, advantages in terms of the energy use of the device 10 can be achieved.

A two-component adhesive can also be used as the adhesive 42 in variants of the device 10, the adhesive starting to cure when bringing the two components together. As a result, providing radiation sources or similar for hardening the adhesive 42 can be avoided. A thermally curing adhesive 42 and/or an adhesive 42 containing solvents can also be used.

In a next step 74, the membrane 26 can be trimmed and thus freed from protruding edge regions, for example (cf. FIG. 1). Subsequently, a—preferably partial —application 78 of the adhesive 42 to the frame material 18 connected to the membrane 26 takes place at a processing station.

Similarly, an application of the adhesive 42 to the frame material 18 takes place in a step 82. A preactivation 84, 86 by means of a respective UV lamp 61 can follow on from the application 78 or step 82.

As can be seen in FIG. 1, the cathodic gas diffusion layer 36 can be provided by a corresponding continuous material web which is unwound from a further roller 76. In a similar manner, the anodic gas diffusion layer 38 is also provided as a continuous material web rolled up on a further roller 80. Respectively, at the next processing station, cutting out 88 the cathodic gas diffusion layer 36 or the anodic gas diffusion layer 38 from the respective material web takes place.

In a further step 90, the cathodic gas diffusion layer 36 and the anodic gas diffusion layer 38 are applied to the frame material 18 or to the membrane 26 from the respective opposite sides. Subsequently, once again, in particular by warming by means of an infra-red lamp 92 and/or in one of the ways described above, the curing of the adhesive 42 can be provided which causes the connection of the gas diffusion layers 36, 38 to the remaining components of the membrane electrode assembly 12. Finally, in a further step, separating 40 the finished component, namely the membrane electrode assembly 12, from the frame material 18 takes place.

The methods described above can also be used when coating or supplying the material web, to which the cathodic gas diffusion layer 36 and the anodic gas diffusion layer 38 can be applied. Here, in particular, a complete or partial application of the adhesive 42 can also be provided.

Figure 2:
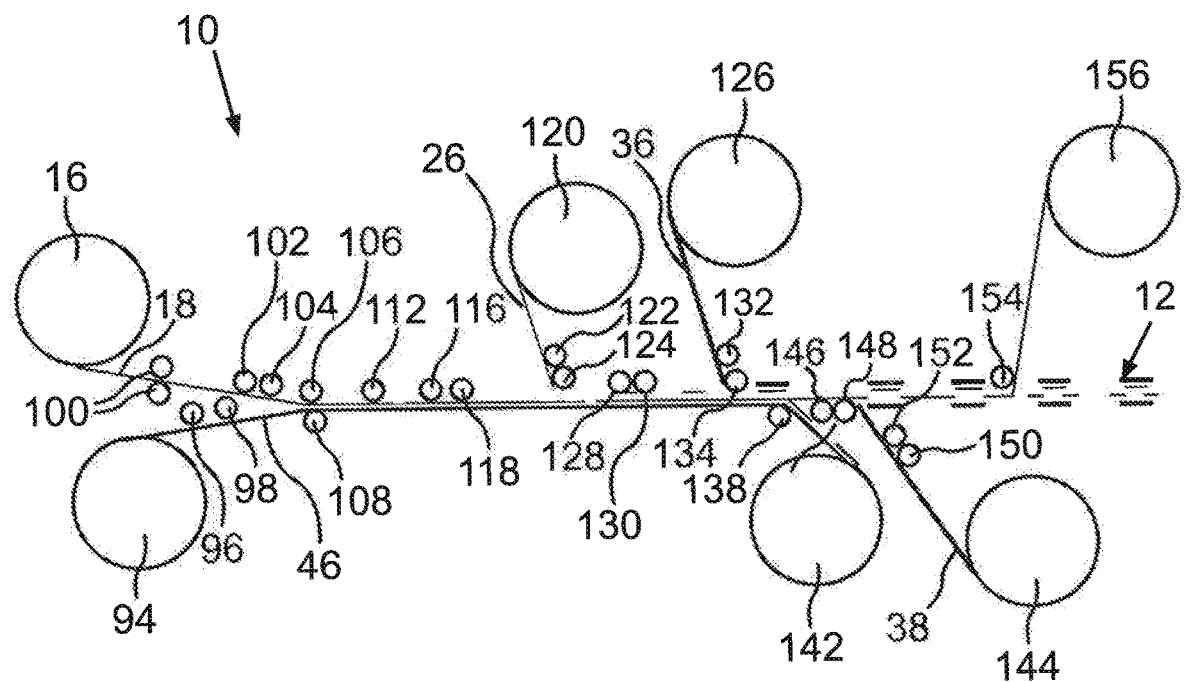
FIG. 2 illustrates a further device for continuously manufacturing the membrane electrode assembly provided with the frame, in a schematic depiction.

A further method for producing the membrane electrode assembly 12 shall be illustrated by means of FIG. 2, which can be carried out by a continuously functioning device 10. Here, in a first step, the carrier web 46 serving as the auxiliary web can be unwound from a further roller 94. In a step illustrated by a circle 96 in FIG. 2, the carrier web 46 is surface-treated on one side in the present case, however also on both sides in alternative embodiments, and then printed with a further adhesive. The corresponding printing operation 98 is illustrated in FIG. 2 by a further circle. The adhesive used here can, in particular, be an adhesive 42 that is different to the one used for connecting the components of the membrane electrode assembly 12. In the present case, the carrier web 46 serving as the auxiliary web is no longer connected to the frame material 18 in the membrane electrode assembly 12 that is finished and stamped out of the frame material 18.

The frame material 18 is unwound from the roller 16, edge-regulated and surface treated on one side (or on both sides). Corresponding circles 100 illustrate this method step. Furthermore, reference points or register marks are preferably printed onto the frame material 18. A corresponding printing operation 102 is also illustrated in FIG. 2. As part of a hardening operation 104, these register marks are cured. The register marks serve, in particular, to regulate the components to be connected to the frame material 18 or further components of the membrane electrode assembly 12 in the following method steps, in particular in terms of the location of the application.

Figure 3:
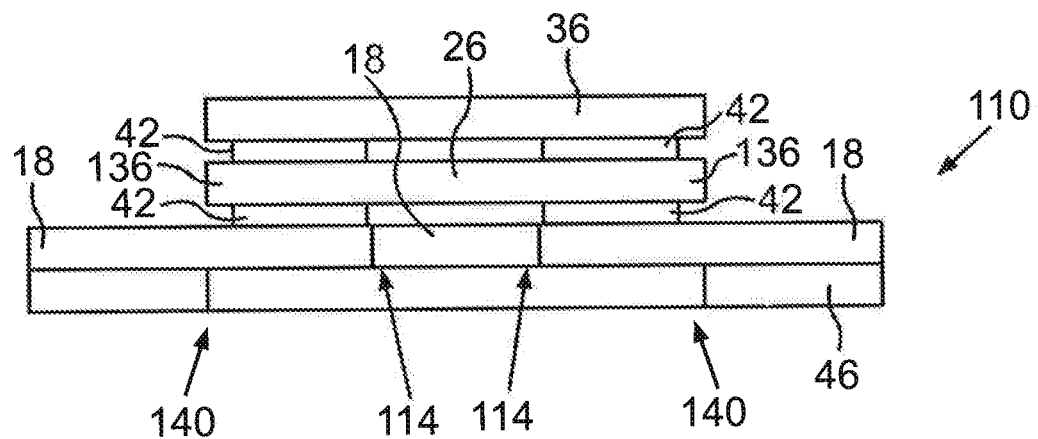
FIG. 3 illustrates the membrane electrode assembly during production by means of the device according to FIG. 2 in a method step, in a schematic detailed depiction.
Figure 4:
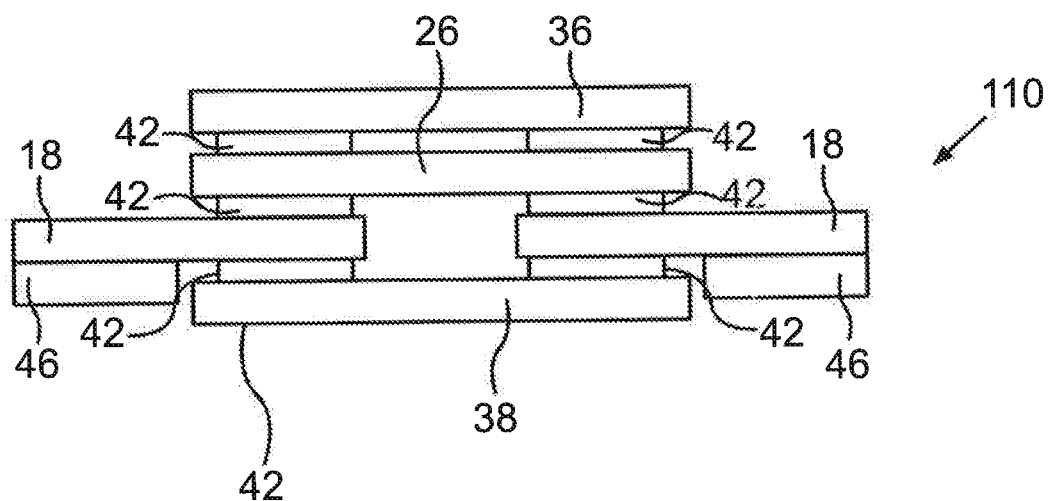
FIG. 4 illustrates the membrane electrode assembly according to FIG. 3 in a further method step, in a schematic detailed depiction.

In a joining operation 106, the carrier web 46 and the frame material 18 are guided together, wherein, in the present case, the frame material 18 is positioned above the carrier web 46. The adhesive previously applied to the carrier web 46 during the printing operation 98 ensures the adherence between the carrier web 46 and the frame material 18. This adhesive is cured in a curing step 108. In the present case, a compound that comprises the frame material 18 and the carrier web 46 is called the base web 110 (cf. FIG. 3). In a cutting operation 112, in a next step, the frame material 18 is separated out from the base web 110 from above. However, here the carrier web 46 is not cut through. In FIG. 3, corresponding points 114 of the base web 110 are shown in a greatly schematized manner for illustration, points 114 at which the frame material 18 is separated, however the adherence of the carrier web 46 is retained.

In a next step, the frame material 18 is printed with the adhesive 42 from above. A corresponding printing operation is illustrated in FIG. 2 by a further circle 116. Alternatively, the printing operation 116 can also be carried out before the cutting operation 112. Subsequently, activation 118 of the adhesive 42 takes place. In a next step, the membrane 26 is unwound from a corresponding roller 120. In a further cutting operation 122, the membrane 26 is cut and is placed on the base web 110 from above. A corresponding joining operation 124 is illustrated in FIG. 2 by a further circle.

Subsequently, the membrane 26 is printed with the adhesive 42, wherein a corresponding printing operation 128 is illustrated in FIG. 2 by a further circle. The adhesive 42 is activated in a next step 130. Subsequently, the cathodic gas diffusion layer 36 is unwound from a further roller 126 and a cutting 132 of the cathodic gas diffusion layer 36 and a placing 134 on the membrane 26 from above takes place. The corresponding method step, in which the cathodic gas diffusion layer 36 is connected to the membrane 26 by the adhesive 42, is illustrated in FIG. 3.

It is particularly clear from the depiction in FIG. 3 that the adhesive 42 connecting the membrane 26 and the gas diffusion layer 36 and the adhesive 42 that connects the frame material 18 and the membrane 26 to each other provides a gas-tight, lateral encapsulation of the membrane 26. The adhesive 42 preferably surrounds respective lateral edges 136 or narrow sides of the membrane 26. Furthermore, it emerges from FIG. 3 that, at this point in time, the carrier web 46 is still intact.

In a next cutting operation 138, (cf. FIG. 2), the base web 110 is cut from below. Here, however, only the carrier web 46 is separated. In FIG. 3, the points 140 at which the cutting operation 138 takes place are illustrated. The middle part of the carrier that emerges in this way, i.e., the carrier web 46, is removed downwardly as waste 142 with the region of the frame material 18 that has already been removed (in the cutting operation 112) and that is connected to the carrier web 46 by means of the adhesive 42.

As a result, the membrane 26 or the frame material 18 is now accessible from below. Correspondingly, it is printed with the adhesive 42 in a next step. A corresponding printing operation 146 is illustrated in FIG. 2 by a further circle. Again, an activation 148 of the adhesive 42 follows on from this printing operation 146. Subsequently, the second anodic gas diffusion layer 38 is unwound from a further roller 144. Subsequently, the region provided for the membrane electrode assembly 12 is cut out from the material web provided in the roller 144, the material web forming the gas diffusion layer 38 of the membrane electrode assembly 12. A corresponding cutting operation 150 is illustrated in FIG. 2 by a further circle.

In a further joining operation 152, the cut-out gas diffusion layer 38 is pressed from below against the membrane 26 that is now released. Here, the adhesive 42 causes the connection of the gas diffusion layer 38 to the frame material 18 (cf. FIG. 4). In this region, the adhesive 42, however, does not need to provide a sealing function, but only provide the adherence of the frame material 18 to the cathodic gas diffusion layer 38.

In a further cutting operation 154, the base web 110 is separated in the region of the frame material 18. This results in the finished membrane electrode assembly 12 with the frame 14 (cf. FIG. 1). The remaining base web 110 is removed as waste 156 from above in a further step (cf. FIG. 2).

The invention claimed is:

1. A method for producing a membrane electrode assembly for a fuel cell, comprising the steps of:
providing a first component of the membrane electrode assembly as part of a continuous material web which passes through a plurality of processing stations, wherein the first component is a frame material, wherein the frame material forms a frame of the membrane electrode assembly, and wherein the frame encloses an active region of the membrane electrode assembly;
connecting a second component of the membrane electrode assembly to the frame material by a first adhesive applied to the frame material, wherein the second component is a membrane with a catalyst material; and
applying the first adhesive to the membrane and connecting a gas diffusion element to the membrane by the first adhesive.

2. The method according to claim 1, wherein the frame material is connected to a carrier web by a second adhesive, wherein a base web is formed by the frame material connected to the carrier web.

3. The method according to claim 1, wherein a reference element is applied to at least one of the first and the second components of the membrane electrode assembly by printing.

4. The method according to claim 1, wherein the first adhesive is applied by a printing method.

5. The method according to claim 4, wherein the printing method is a silk-screen printing method.

* * * * *